United States Patent [19]

Pendlebury

[11] 4,148,512
[45] Apr. 10, 1979

[54] POSITIVE ACTION FISHING GAFF

[76] Inventor: Bruce C. Pendlebury, 161 Orchard Cres., Regina, Canada, S4S 5B7

[21] Appl. No.: 857,388

[22] Filed: Dec. 5, 1977

[51] Int. Cl.² ............................................. B65G 7/12
[52] U.S. Cl. ......................................... 294/26; 43/5
[58] Field of Search ............... 43/5; 294/26; 119/151, 119/152; 81/3.48, 3.49; 269/47

[56] References Cited

U.S. PATENT DOCUMENTS

| | | | |
|---|---|---|---|
| 2,517,507 | 8/1950 | Rowan | 294/26 |
| 2,723,152 | 11/1955 | Doty | 294/26 |

FOREIGN PATENT DOCUMENTS 510094  2/1955  United Kingdom ........................... 43/5

OTHER PUBLICATIONS

IBM Technical Disclosure Bulletin, Spring Hook; vol. 5, No. 1, Jun. 1962.

Primary Examiner—Robert C. Watson
Attorney, Agent, or Firm—Stanley G. Ade

[57] ABSTRACT

An apertured platen is formed on the end of a handle and a gaff hook component is slidably mounted along the handle and can be pulled into engagement with the apertured platen by means of a trigger at the other end of the handle. A spring normally holds the gaff hook component in the open position so that the platen can be engaged within the mouth of the fish or upon the underside of the nose if the mouth is closed, with the hook engaging the soft underside of the lower jaw. The hook is pulled through the soft lower jaw and latched into the closed position by a spring loaded latch in the handle.

8 Claims, 6 Drawing Figures

U.S. Patent  Apr. 10, 1979  4,148,512
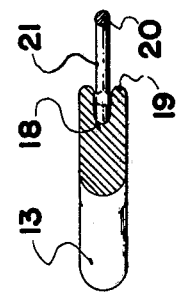
FIG. 6
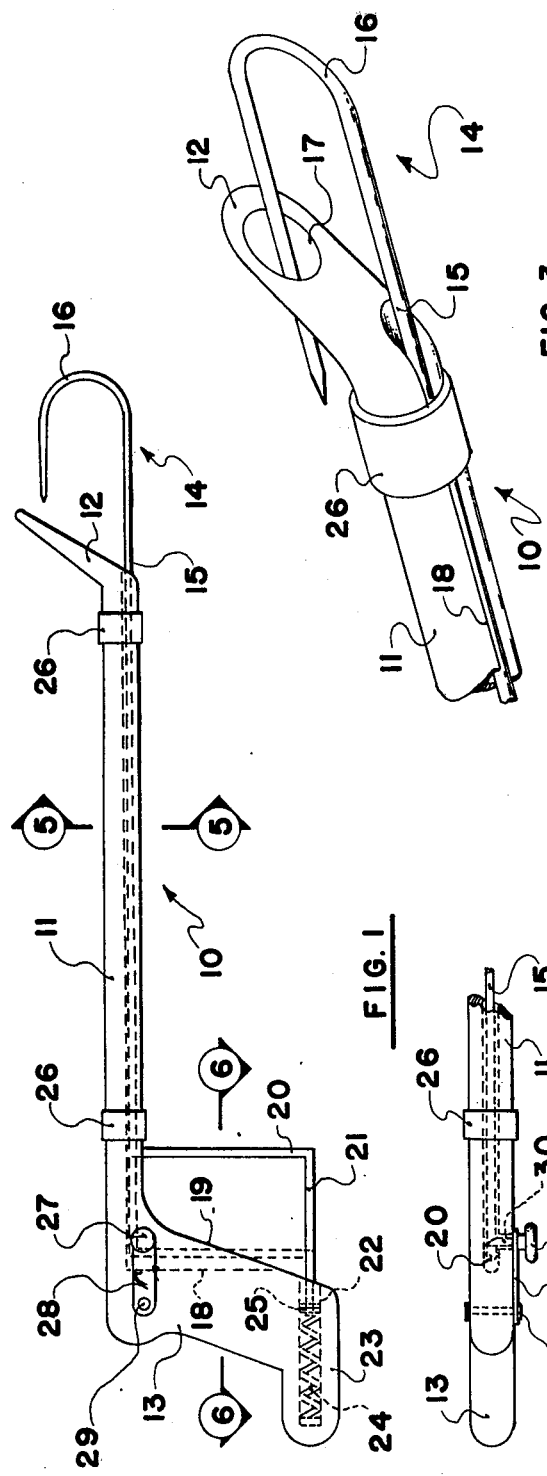
FIG. 3
FIG. 1
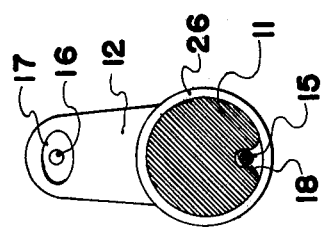
FIG. 5
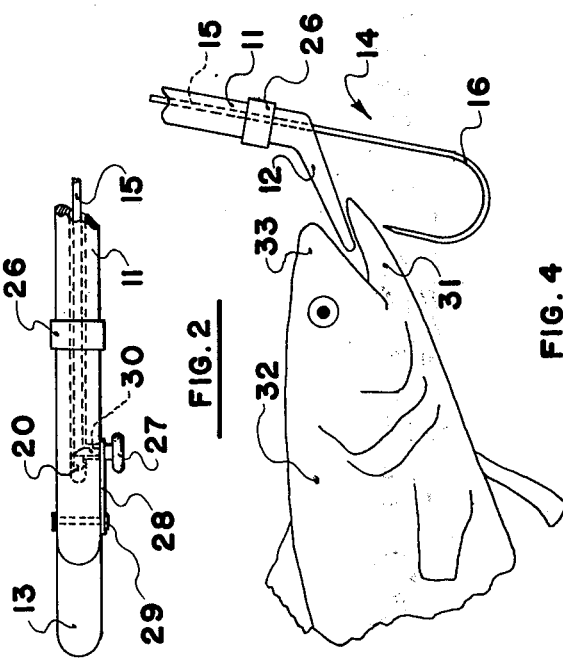
FIG. 2
FIG. 4

POSITIVE ACTION FISHING GAFF

BACKGROUND OF THE INVENTION

This invention relates to new and useful improvements in positive action fishing gaffs.

Conventionally a net or a hook gaff is used to land a fish. If the fish is relatively large, it is difficult to use a net competently so that a hooked gaff is used under these circumstances. However the conventional hooked gaff is an open hook which is engaged normally through the gill or through the underside of the jaw but because it is an open hook, it is relatively easy for the fish to jump off the hook of the gaff.

SUMMARY OF THE INVENTION

The present invention overcomes these disadvantages by providing a positive action fishing gaff which includes means to detachably lock the gaff in position once it has been engaged through the soft lower jaw of the fish so that it is not possible for the fish to disengage from the gaff until the latch mechanism is released.

One aspect of the invention comprises a positive action fishing gaff comprising in combination an elongated handle, an apertured platen on one end of said handle and a gaff hook component mounted for movement upon said handle from an open position to a closed position and vice-versa, said gaff hook component including a hook end portion engageable through said apertured platen when in the closed position and being clear of said platen when in the opened position.

Another aspect or object of the invention is to provide a device of the character herewithin described which can be used either upon the lower jaw of the fish if the mouth of the fish is open, or alternatively, can be engaged around both jaws if the mouth is closed. In either case, the hook portion engages through the soft tissue of the lower jaw.

Yet another aspect or object of the invention is to provide a device which is easily manipulated by one hand insofar as the latching mechanism is concerned.

A still further aspect of object of the invention is to provide a device of the character herewithin described which is simple in construction, economical in manufacture and otherwise well suited to the purpose to which it is designed.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a side elevation of the device.

FIG. 2 is a fragmentary top plan view of the hand grip end of the device.

FIG. 3 is a fragmentary isometric view of the other end of the device.

FIG. 4 is a schematic view of said other end of the device shown just prior to engaging within the lower jaw of the mouth of a fish.

FIG. 5 is a cross sectional view along the 5—5 of FIG. 1.

FIG. 6 is a cross sectional view along the line 6—6 of FIG. 1.

In the drawings like characters of reference indicate corresponding parts in the different figures.

DETAILED DESCRIPTION

Proceeding therefore to describe the invention in detail, reference should be made to the drawings in which reference character 10 illustrates an elongated handle which may be made of plastic or metal as desired.

This handle includes the substantially cylindrical elongated portion 11 having a platen 12 formed at one end thereof and extending at an angle from the longitudinal axis of the portion 11, said angle being approximately 50° although this is not critical.

A hand grip portion 13 is formed on the other end of the elongated portion 11 and extends downwardly at a slight angle, and in a direction from the longitudinal axis, opposite to the direction from which the platen extends.

A gaff hook component collectively designated 14 is provided which includes an elongated rod 15 having a counterangulated hook end portion 16 formed on one end thereof with the hook facing an aperture 17 formed in the aforementioned platen 12 as clearly illustrated in FIG. 3.

Means are provided to mount the gaff hook component 14 for sliding movement relative to the handle 10 and in this embodiment, said means includes an elongated slot 18 formed along the underside of the elongated portion 11 of the handle and part way along the inner surface or edge 19 of the hand grip portion 13.

The elongated rod 15 is angulated at the inner end thereof through approximately 90° to form the hand engaging or trigger portion 20 and is then angulated again through approximately 90° to form an end portion 21 which is spaced from but substantially parallel to the main elongated portion 15.

The end of the portion 21 engages within a drilling 22 formed adjacent the lower side 23 of the hand grip portion 13, said drilling running substantially parallel with the elongated portion 11 of the handle and containing a compression spring 24 which reacts between the inner end of the drilling 22 and a plate or disk 25 secured to the end of the portion 21 engaged within the drilling 22 so that this spring 24 normally maintains the hooked portion 16 spaced from the platen 12 as clearly shown in FIGS. 1 and 4.

A pair of cylindrical bands 26 engage around the elongated portion 11 of the handle and span the slot 18 thus retaining the gaff hook component 14 within the handle for sliding movement therealong.

From the foregoing it will be appreciated that if the portion 13 of the handle is held within the hand, the fingers may engage around the substantially vertical trigger portion 20 of the gaff hook component 14 and pressure upon this portion will retract the hook end through the aperture 17 to the position clearly shown in FIG. 3, and against pressure of spring 24.

Means are provided to latch the gaff hook component in the position shown in FIG. 3 or in the "closed" position, said means taking the form of a latch pin 27 secured to one end of a spring strip 28 which in turn is secured to one side of the handle by means of a rivet or the like 29 and it will be noted that this latch component is situated adjacent the upper end of the hand grip portion 13 and that the pin 27 engages an aperture drilled transversely through the hand grip portion thus spanning the slot formed within the inner surface 19 of the hand grip portion. The inner end of the pin 27 is angulated as indicated by reference character 30 and is engaged by the vertical portion 20 of the gaff hook component 14 when it is retracted to the position shown in phantom in FIG. 1. The spring strip 28 normally holds the pin in the innermost position illustrated in FIG. 2 and when the rod strikes the sloping surface 30, the pin is moved outwardly slightly to allow the rod to pass thereby whereupon the pin snaps inwardly and holds the vertical portion 20 in the innermost position and thus holds the hooked end 16 into engagement with the aperture 17 of the platen.

To disengage, it is merely necessary to move the pin 27 outwardly against pressure of the spring strip 28 whereupon spring 24 will extend the hooked portion 16 to the open position illustrated in FIG. 1.

FIG. 4 shows the device in use with the platen engaged upon the inside of the lower jaw 31 of the fish 32 with the hook underneath the soft skin of the lower jaw. By closing the gaff hook component to the position shown in FIG. 3, the hook engages through the soft tissue of the lower jaw and through the aperture 17 in the platen and is latched by latch pin 27 so that the fish can be landed.

If the mouth of the fish is closed, the platen can be placed upon the upper side of the nose 33 of the fish with the hooked end portion of the gaff hook component once again engaging under the lower jaw 31. Once again it may be moved to the closed position and latched thus allowing the fish to be landed safely.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A positive action fishing gaff comprising in combination an elongated handle, an apertured platen on one end of said handle and a gaff hook component mounted for movement upon said handle from an open position to a closed position and vice-versa, said gaff hook component including a hook end portion engageable through said apertured platen when in the closed position and being clear of said platen when in the opened position and spring means normally urging said gaff hook component to said open position.

2. The gaff according to claim 1 which includes means adjacent the other end of said handle for moving said gaff hook component relative to said handle.

3. The gaff according to claim 1 which includes latch means in said handle automatically engaging said gaff hook component when in the closed position to detachably hold said gaff hook component in said closed position.

4. The gaff according to claim 2 which includes latch means in said handle automatically engaging said gaff hook component when in the closed position to detachably hold said gaff hook component in said closed position.

5. The gaff according to claim 1 in which said platen is angulated from the longitudinal axis of said handle, means mounting said gaff hook component for movement upon said handle, said means including an elongated portion on said handle and a hand grip portion at the other end of said handle, a longitudinally extending slot formed along said elongated portion and at least part way along said hand grip portion, said gaff hook component including an elongated rod extending from one side of said hooked end thereof and slidably engaging within said slot in said elongated portion, means securing said elongated rod for said sliding action, to said elongated portion, an angulated portion on the other end of said elongated rod to form a hand engaging portion for said gaff hook component.

6. The gaff according to claim 4 in which said platen is angulated from the longitudinal axis of said handle, means mounting said gaff hook component for movement upon said handle, said means including an elongated portion on said handle and a hand grip portion at the other end of said handle, a longitudinally extending slot formed along said elongated portion and at least part way along said hand grip portion, said gaff hook component including an elongated rod extending from one side of said hooked end thereof and slidably engaging within said slot in said elongated portion, means securing said elongated rod for said sliding action, to said elongated portion, an angulated portion on the other end of said elongated rod to form a hand engaging portion for said gaff hook component.

7. The gaff according to claim 2 in which said platen is angulated from the longitudinal axis of said handle, means mounting said gaff hook component for movement upon said handle, said means including an elongated portion on said handle and a hand grip portion at the other end of said handle, a longitudinally extending slot formed along said elongated portion and at least part way along said hand grip portion, said gaff hook component including a elongated rod extending from one side of said hooked end thereof and slidably engaging within said slot in said elongated portion, means securing said elongated rod for said sliding action, to said elongated portion, an angulated portion on the other end of said elongated rod to form a hand engaging portion for said gaff hook component.

8. The gaff according to claim 3 in which said platen is angulated from the longitudinal axis of said handle, means mounting said gaff hook component for movement upon said handle, said means including an elongated portion on said handle and a hand grip portion at the other end of said handle, a longitudinally extending slot formed along said elongated portion and at least part way along said hand grip portion, said gaff hook component including an elongated rod extending from one side of said hooked end thereof and slidably engaging within said slot in said elongated portion, means securing said elongated rod for said sliding action, to said elongated portion, an angulated portion on the other end of said elongated rod to form a hand engaging portion for said gaff hook component.

* * * * *